United States Patent
Bandic et al.

(10) Patent No.: US 7,312,939 B2
(45) Date of Patent: Dec. 25, 2007

(54) SYSTEM, METHOD, AND APPARATUS FOR FORMING A PATTERNED MEDIA DISK AND RELATED DISK DRIVE ARCHITECTURE FOR HEAD POSITIONING

(75) Inventors: Zvonimir Z. Bandic, San Jose, CA (US); Tsai-Wei Wu, San Jose, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 373 days.

(21) Appl. No.: 11/066,665

(22) Filed: Feb. 25, 2005

(65) Prior Publication Data

US 2006/0193070 A1    Aug. 31, 2006

(51) Int. Cl.
*G11B 5/86* (2006.01)
(52) U.S. Cl. .......................................... 360/15; 360/16
(58) Field of Classification Search ..................... None
See application file for complete search history.

(56) References Cited

U.S. PATENT DOCUMENTS

| | | | |
|---|---|---|---|
| 4,587,579 A | 5/1986 | Cocke et al. | |
| 5,828,536 A | 10/1998 | Morita | |
| 5,995,461 A | 11/1999 | Sedlmayr et al. | |
| 6,058,084 A | 5/2000 | Yamamoto et al. | |
| 6,144,517 A | 11/2000 | Watanabe et al. | |
| 6,421,195 B1 | 7/2002 | Rubin et al. | |
| 6,590,729 B1 | 7/2003 | Akagi et al. | |
| 6,611,388 B1 | 8/2003 | Miyata et al. | |
| 6,643,082 B1 | 11/2003 | Belser | |
| 6,754,032 B1 | 6/2004 | Szita et al. | |
| 6,757,116 B1 | 6/2004 | Curtiss et al. | |
| 6,781,785 B2 | 8/2004 | Belser et al. | |
| 2003/0026036 A1* | 2/2003 | Chew | 360/77.08 |
| 2005/0094298 A1* | 5/2005 | Sakurai et al. | 360/15 |

OTHER PUBLICATIONS

Kenjiro Watanabe, Toru Takeda, Kanzo Okada and Hiroshi Takino; "Demonstration of Track Following Technique Based on Discrete Track Media", IEEE Transactions on Magnetics, vol. 29, No. 6, Nov. 1993.

Shoji Tanaka, Yasuyuki Imai, Osamu Morita, David Dericotte, Kotaro Kurokawa, Toshiyuki Kashiwage and Hiroshi Takino, "Characterization of Magnetizing Process for Pre-Embossed Servo Pattern of Plastic Hard Disks", IEEE Transactions on Magnetics, vol. 30, No. 6, Nov. 1994.

Ho Seong Lee, Implementation of Adaptive Feedforward Cancellation Algorithms for Pre-Embossed Rigid Magnetic (PERM) Disks, IEEE Transactions on Magnetics, vol. 33, No. 3, May 1997.

* cited by examiner

*Primary Examiner*—Andrea Wellington
*Assistant Examiner*—Varsha A. Kapadia
(74) *Attorney, Agent, or Firm*—Bracewell & Giuliani LLP

(57) ABSTRACT

A solution to the problem of long, e-beam mastering times needed for patterning masters for patterned magnetic disk media is disclosed. A process for fabrication of masters takes advantage of the circular symmetry of magnetic disks and reduces the total required mastering time by an order of magnitude over prior art processes. This process relies on e-beam mastering of one small arcuate portion of the master, and then replicating that portion around a circular path on the master several times to create a full disk master. The architecture of this design also corrects for errors in head positioning on the final patterned media disk that may be introduced by the mastering process.

16 Claims, 4 Drawing Sheets

SYSTEM, METHOD, AND APPARATUS FOR FORMING A PATTERNED MEDIA DISK AND RELATED DISK DRIVE ARCHITECTURE FOR HEAD POSITIONING

BACKGROUND OF THE INVENTION

1. Technical Field

The present invention relates in general to manufacturing patterned media and, in particular, to an improved system, method, and apparatus for patterned media disk nanoimprinting and a related disk drive architecture for head positioning.

2. Description of the Related Art

In future hard disk drives, it is expected that all magnetic media having an areal density greater than 1 $Tb/in^2$ will require patterned media. Known manufacturing processes for making patterned media rely on fabrication of a single, complete master that is replicated many times to create whole replicas. Upon deposition of magnetic material, the replicas become actual patterned media disks that are used in reading and writing information. Typically, the replication process relies on "nanoimprinting" or stamping. The patterned surface on the master is used to imprint on a polymer on an imprinted substrate. The pattern created in the polymer is then permanently transferred to the imprinted substrate using conventional manufacturing processes such as wet and dry etching, metal lift-off, etc. It is also common to form several whole stampers from the single master and create many replicas from each stamper.

Due to the small feature sizes (smaller than 25 nm), the masters will likely have to be fabricated by using high resolution e-beam lithography. E-beam lithography is a very precise but slow process that may require hundreds of hours to generate masters. This represents a major portion of the time and cost needed to create masters. In addition, mastering processes that require this much time may suffer from overall, e-beam system instability over the long periods of time and may therefore be unmanufacturable even if the cost associated with lengthy mastering times was affordable. Thus, an improved solution for manufacturing patterned media would be desirable.

SUMMARY OF THE INVENTION

Embodiments of a system, method, and apparatus for forming a patterned media disk and a related disk drive architecture for head positioning are disclosed. The present invention creates a full area patterned media master by (1) first creating a sub-master in the form of "pie slice" that contains approximately 10% of the area of the full patterned master using, for example, e-beam lithography or other high resolution methods (e.g., x-ray lithography, ion beam lithography, etc.); (2) stamping (e.g., nanoimprinting) the full area of the master with the sub-master and repeating the nanoimprinting in a circumferential direction around the master; and (3) providing a hard disk drive system architecture for correcting head positioning errors that may result from this process.

For example, one embodiment of the head positioning correction process measures and stores positioning errors between each two adjacent sections and uses those values for correction of the head position. Significantly, the process also creates an additional dedicated servo (head-positioning) field for each sub-section. These additional fields are used to correct remaining radial position shifts that are smaller than, for example, one-half data track. In addition, the full area master created by this process may be used to create several stampers for creating actual patterned media disks.

In one embodiment, the present invention comprises a method of patterned media disk nanoimprinting and a related disk drive architecture for head positioning. The method comprises creating a portion of a sub-master pattern; developing resist and using other manufacturing processes to create a sub-master based on the portion of the sub-master pattern, the sub-master comprising only a section of a full area master; using the sub-master as a pattern to form all sections of the full area master; transferring the pattern of the full area master into a master substrate; and providing a dedicated servo section that is used for correction of radial track positioning errors between sections.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
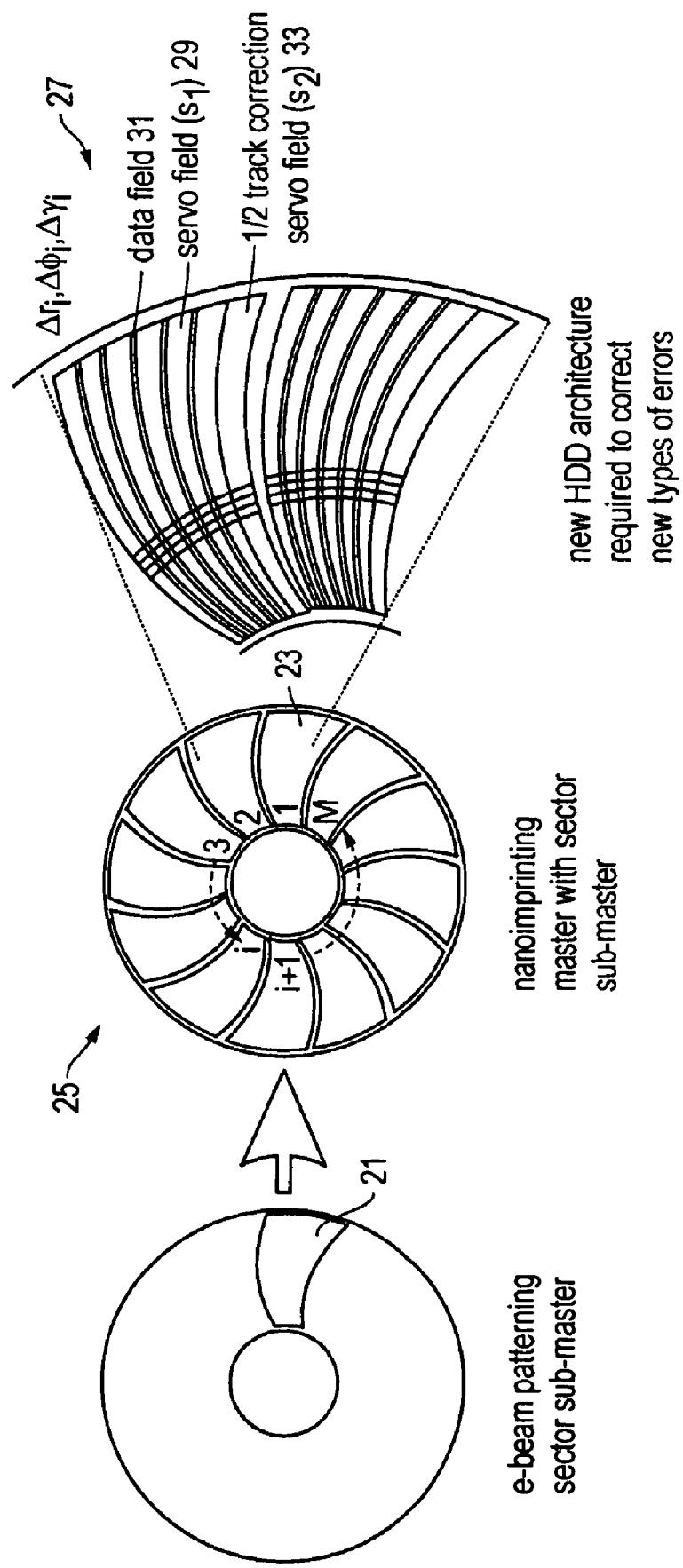
FIG. 1 is a series of schematic diagrams depicting one embodiment of a nanoimprinted media disk and a related disk drive architecture for head positioning constructed in accordance with the present invention.

Referring to FIG. 1, one embodiment of the present invention is depicted. Initially, one section of a sub-master pattern 21 is created using a high resolution technique. Following e-beam lithography, development of resist and other manufacturing processes (such as metal lift-off, etching, etc.) are used to create the sub-master 23. The sub-master 23 is used to create a full area master 25. The sub-master 23 is stamped or nanoimprinted repeatedly into polymer on the surface of the master substrate a number of times (e.g., for "M" sections) in a circumferential direction around the master substrate. Following nanoimprinting of the polymer, the pattern imprinted in the polymer is transferred into the master substrate using, for example, dry etching, wet etching, or metal lift-off. Each subsection 27 contains an equal number of servo sectors 29 that are used for head positioning and data sectors 31 that contain patterned media bits. At the beginning of each subsection 27 there is a "dedicated servo" sector 33 that is used for correction of radial track positioning errors smaller than one-half track width.

The total time to pattern an entire master 25 with e-beam lithography is given by $T_{total}$. If the full area of the master 25 is divided into M subsections 27, and if the time required for stamping or nanoimprinting one section 27 is $T_s$, the time needed to create the full area master 25 is described by the following equation. The present invention significantly improves total mastering time by a factor of M. For example:

new time=$T_{total}/M+M*Ts$, where $T_s<<T_{total}$ ($T_s$ is negligible when compared to $T_{total}$).

Figure 2:
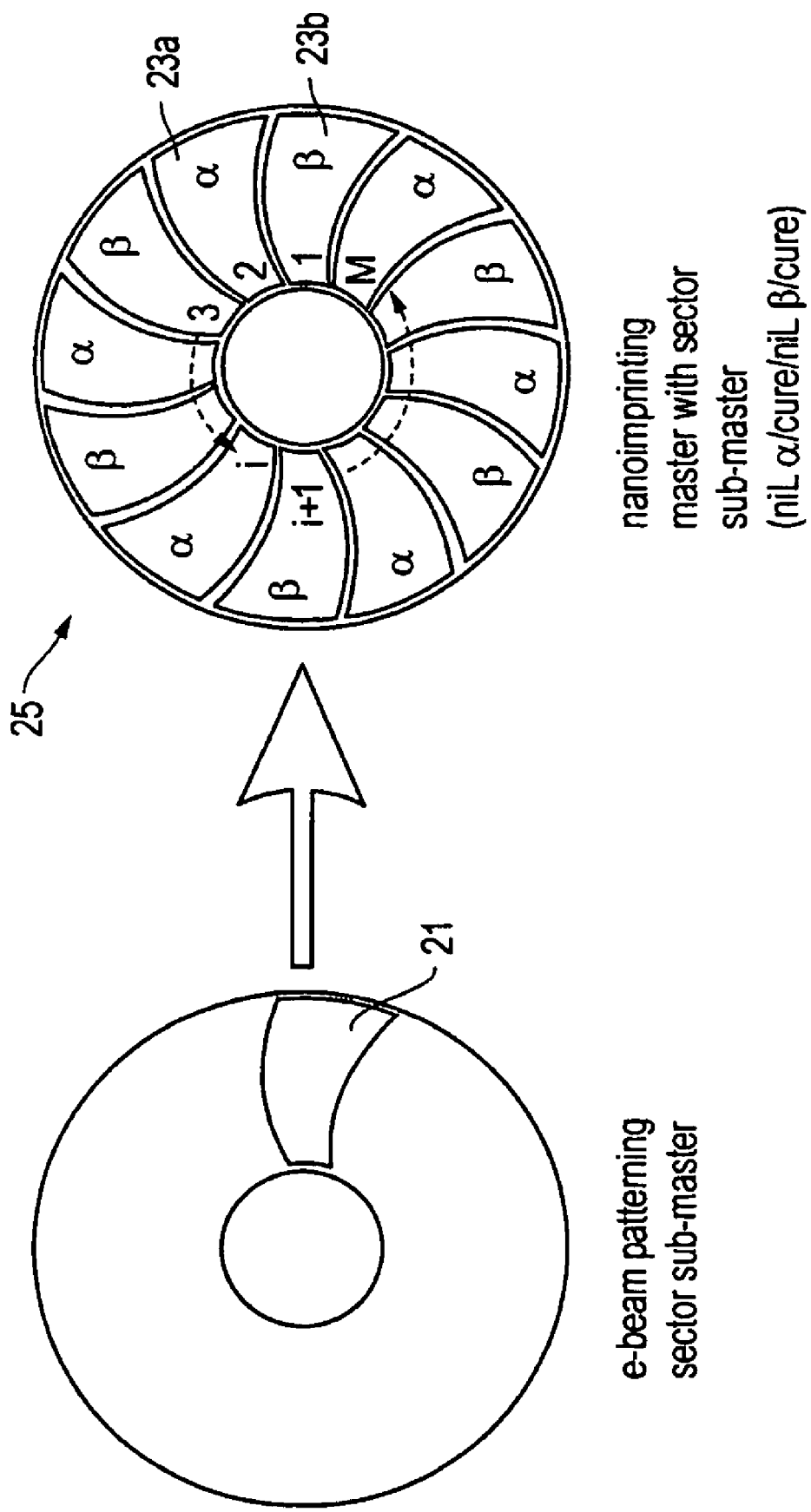
FIG. 2 is an enlarged diagram illustrating an e-beam patterned sector sub-master and nanoimprinted master.

FIG. 2 describes one embodiment of an approach to nanoimprinting of the master 25, including: (a) nanoimprinting even-numbered sections 23a first and then transferring the nanoimprinted polymer pattern into the substrate by using dry or wet etching or metal lift-off; and (b) nanoimprinting odd-numbered sections 23b into polymer and transferring their pattern into the substrate. This approach minimizes the errors that may result due to flow of the nanoimprinting polymer at the boundary of the sub-master, or at the boundary of one stamped subsection.

The right side of FIG. 1 illustrates the layout of each of the subsections. Each nanoimprinted subsection 27 has: (a) data fields 31 that contain patterned media bits; (b) servo or head positioning fields 29 (labeled "$s_1$") that are similar in nature to present-day servo fields (i.e., contain gain control, servo synchronization mark, cylinder code, and fine positioning or positioning error signal information); (c) special servo fields 33 (labeled $s_2$) that are used to correct head positioning errors smaller than one-half data track. Each of the subsections may be offset from its ideal position in a radial direction (i.e., relative to an axis of rotation of the disk), an angular direction (i.e., displaced along the circular track), or rotationally tilted. All these errors must be measured and corrected by the proposed servo architecture.

When a full area master is created by nanoimprinting subsection master M times in the circumferential direction, the cylinder code values in each of the $s_1$ sectors will not be lined up along the circular track due to radial direction errors ($\Delta r$) and tilt errors ($\Delta \gamma$). In this case, a memory table is formed (stored in the disk drive ROM) with dimensions of M rows by N columns. Each row j represents radial errors present on the j-th subsection at N point from ID to OD (practical value for N is of the order of magnitude of about 10). These radial errors are all measured relative to the same base values, which may be defined by the first nanoimprinted subsection. After all these values are stored in the table, it is easy to keep the cylinder position in each of the subsections accurate by simply correcting by the error value stored in the table. However, after correcting for the cylinder value, there is a remainder error that is smaller than one-half track, which is the reason for the additional servo field $s_2$.

In addition to the radial error it is also possible to introduce angular error ($\Delta \phi$) along the circular direction. Angular error introduces servo sampling synchronization problems. Currently, the window for detecting SAM (characteristic signature of servo field that turns on servo every sample) is approximately 2% of one sampling time. For example, if the track pitch is 25 nm, the estimated number of sectors required is about 500 to 1000 for a one-inch drive. Assuming a one-inch drive and 3600 rpm, the maximum value for angular error along the circular direction is: 360/1000*0.02=26 arc sec. This value may be reasonably achieved by good mechanical positioning of the sub-master during subsection nanoimprinting and should not represent a difficulty.

Figure 3:
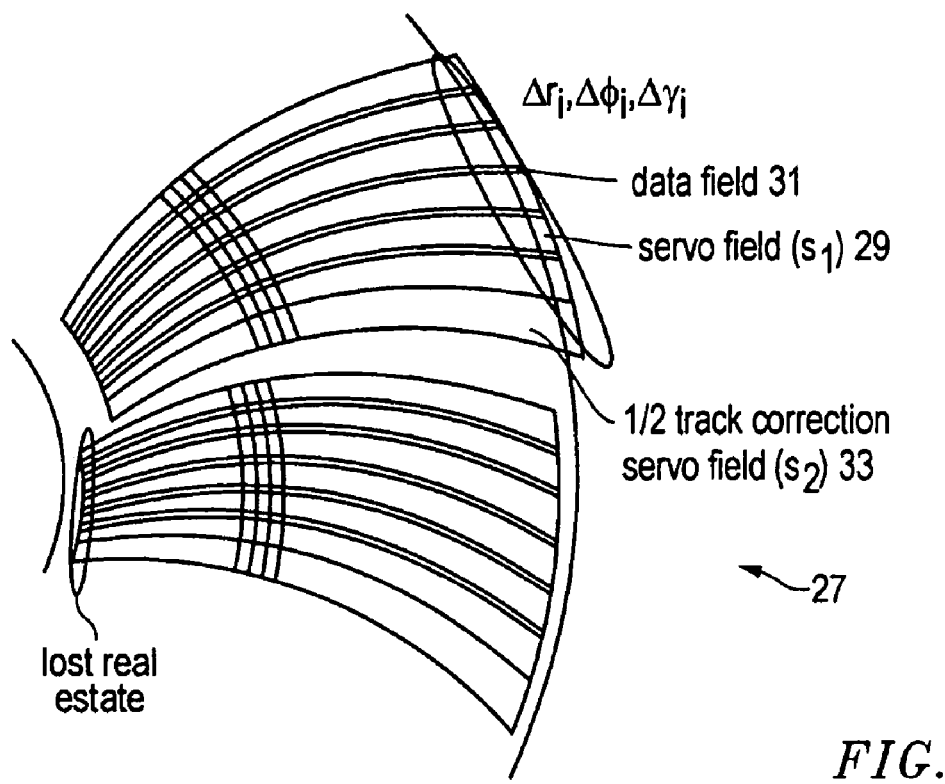
FIG. 3 is a further enlarged diagram illustrating one embodiment of data, servo, and correction fields for a subsection.

FIG. 3 shows that the maximum allowed radial positioning error during mastering is defined by the disk area real estate lost at the far ends of the ID and OD due to the mismatch. Before cylinders stop matching each other due to the radial shift, there may be a significant loss of real estate. If acceptable real estate loss is approximately 0.2% (delta_r-max=½×(rOD−rID)×0.002, which is approximately 6 microns in the case of one-inch disks. This value also may be controlled by careful positioning of the submaster during nanoimprinting of subsections.

Figure 4:
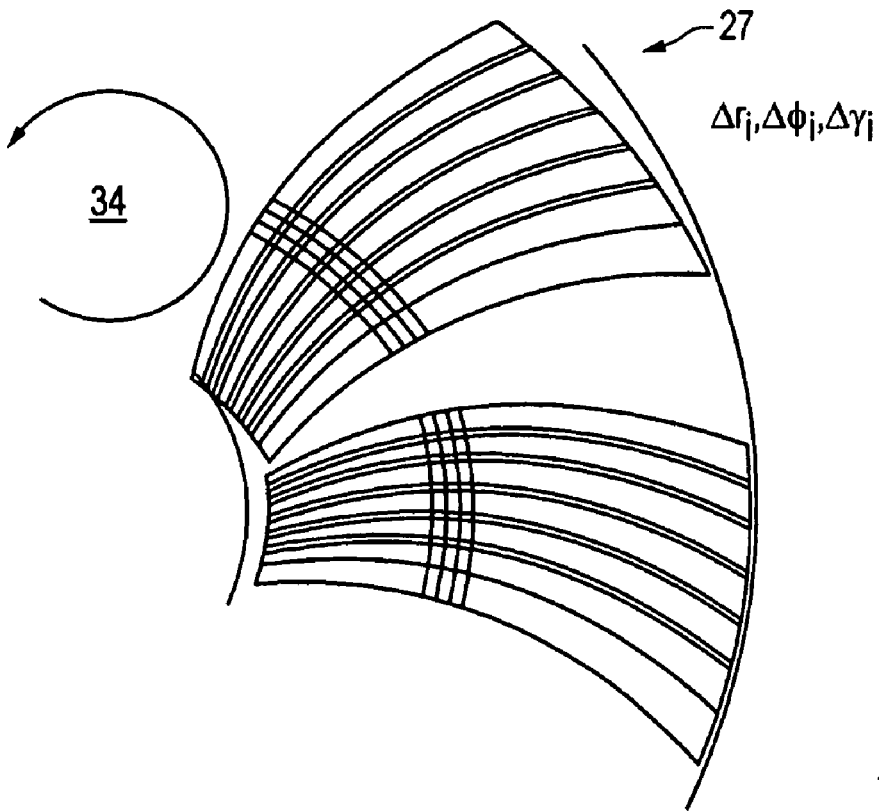
FIG. 4 is a further enlarged diagram illustrating tilt of a subsection.

FIG. 4 illustrates a subsection 27 that was imprinted with built-in "tilt error" as shown by arrow 34. Without any correction schemes, the position shift per sector caused by tilt should be less than 5 to 10% of the track. This value may be reasonable enough and may be achieved by precise mechanical positioning of the sub-master. Alternatively, the value of tilt needs to be measured for each subsector. This may be done with a single measurement per subsector if radial shift is already measured. Once tilt is known, a table is created with target PES values for N zones (approximately 10) inside each subsector. This table requires approximately 16×10×1000=160 kbits). The feed-forward scheme with closed loop servo would be used, which is similar to RRO correction today.

The one-half track error may be corrected in several ways. The $s_2$ field measures the actual position of the head and provides this correction. Since practically useful values for M (the number of sections) are 5 to 10, and since the maximum allowed overhead for $s_2$ fields is 5% to 10%, $s_2$ fields are kept in each subsection shorter than approximately 1% of the revolution, or 1% of the circumference of the circular track.

There are several practical approaches for $s_2$ fields. A correction table may be constructed containing one-half track or less shift values for each subsector divided into 20 radial sub-zones (i.e., this table is M subsection×20). Following the rule of thumb that a settling time for a control system with bandwidth BW is 1/BW, the estimated settling time for a 3600 rpm patterned media disk is: 0.01×60/3600=166 µs, which would require at least 6 KHz of bandwidth. This bandwidth is achievable using a dual-stage actuator employing a MEMS microactuator, and by using higher sampling frequency inside $s_2$ fields.

Figure 5:
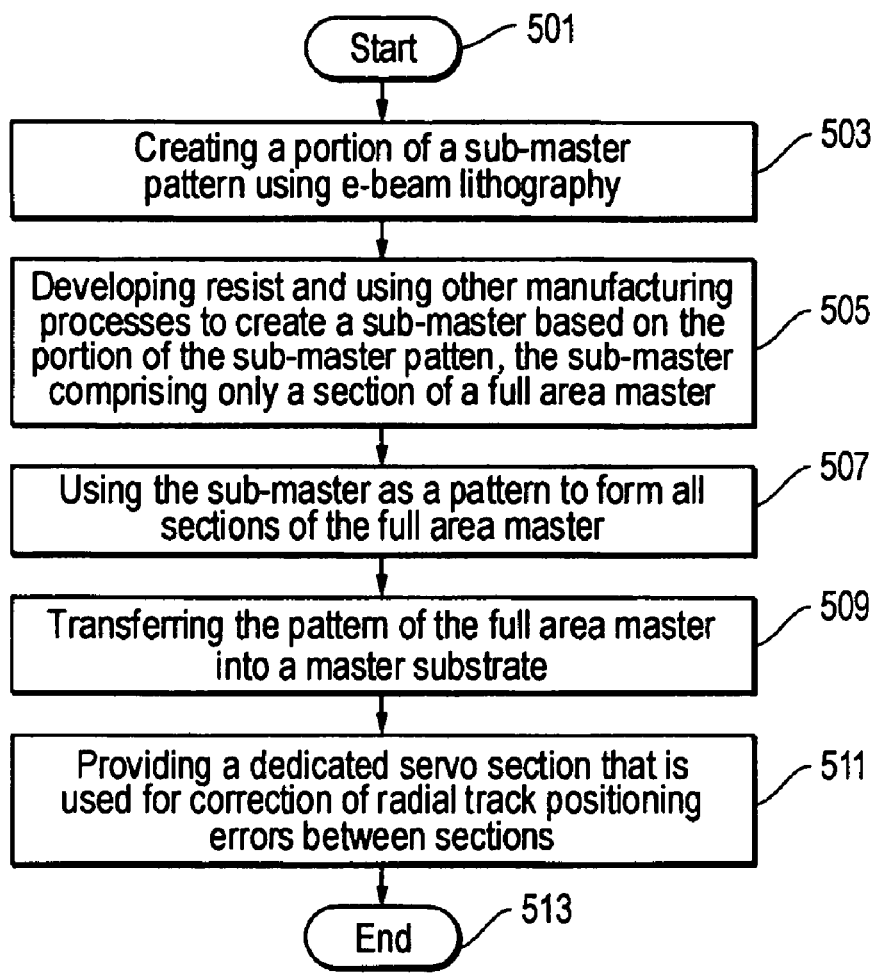
FIG. 5 is a high level flow diagram of one embodiment of a method constructed in accordance with the present invention.

Referring now to FIG. 5, the present invention also comprises a method of forming a patterned media disk and a related disk drive architecture for head positioning. After starting at block 501, one embodiment of the method comprises creating a portion of a sub-master pattern, as illustrated at block 503. As depicted at block 505, resist is developed and other manufacturing processes are used to create a sub-master based on the portion of the sub-master pattern, the sub-master comprising only a section of a full area master. As illustrated at block 507, the sub-master is used as a pattern to form all sections of the full area master, and the pattern of the full area master is transferred into a master substrate (block 509), which can then be used to form one or more replicas of the master substrate. In addition, a dedicated servo section is provided (block 511) that is used for correction of track positioning errors between sections. The method ends as depicted at block 513.

At block 507, the method may further comprise repeatedly using the sub-master on a surface of the master substrate by rotating the sub-master in a circumferential direction around an axis of the master substrate and by nanoimprinting the sub-master on the master substrate. In addition, the method may further require each section to contain an equal number of servo sectors that are used for head positioning and data sectors that contain patterned media bits, locating the dedicated servo sections at a beginning of each section, and providing one dedicated servo section for each section to define a plurality of dedicated servo sections that correct radial, angular, and rotational track positioning errors that are smaller than one-half track width.

In another embodiment, the method may further comprise defining even-numbered and odd-numbered sections, and nanoimprinting even-numbered sections first and then transferring a nanoimprinted polymer pattern into the master substrate by etching or metal lift-off, and nanoimprinting odd-numbered sections into polymer and transferring their pattern into the master substrate; and further comprising forming a memory table stored in a ROM in a disk drive for errors present from an inner diameter to an outer diameter of a disk in the disk drive, the errors being measured relative to base values, which may be defined by a first nanoimprinted section, to keep a cylinder position in each section accurate by correcting with an error value stored in the memory table.

Figure 6:
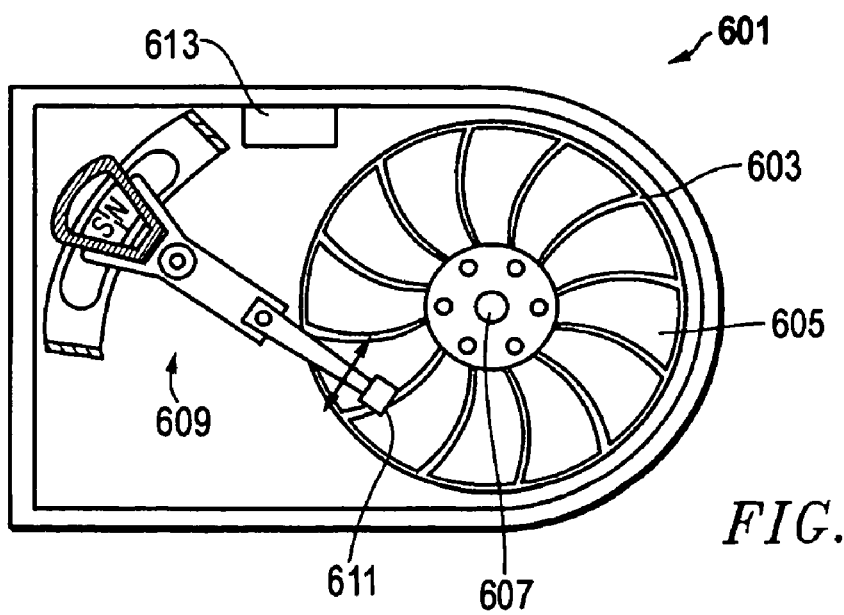

Referring now to FIG. 6, the present invention also comprises a disk drive 601 comprising a patterned media disk 603 having a plurality of disparate sections 605 arranged circumferentially around a rotational axis 607 of the patterned media disk 603. An actuator 609 having a head 611 is used for reading data from and/or writing data to the patterned media disk 603.

As described above, the disk drive 601 also has a disk drive architecture for head positioning having a dedicated servo section that is used for correction of track positioning errors between sections 605. Each section 605 may contain an equal number of servo sectors for head positioning and data sectors that contain patterned media bits, and the dedicated servo section may be located at a beginning of each section to define a plurality of dedicated servo sections that correct radial, angular, and rotational track positioning errors that are smaller than one-half track width. The disk drive may further comprise a memory table stored in a ROM 613 in the disk drive for errors present from an inner diameter to an outer diameter of the patterned media disk, the errors being measured relative to base values to keep a cylinder position in each section accurate by correcting with an error value stored in the memory table.

While the invention has been shown or described in only some of its forms, it should be apparent to those skilled in the art that it is not so limited, but is susceptible to various changes without departing from the scope of the invention.

What is claimed is:

1. A method of forming a patterned media disk, the method comprising:
    (a) creating a portion of a sub-master pattern;
    (b) creating a sub-master based on the portion of the sub-master pattern, the sub-master comprising only a single section of a full area master that comprises a plurality of sections;
    (c) using the single section of the full area master as a pattern to form at least one of the plurality of sections, and moving and applying the single section to the full area master until all of the plurality of sections of the full area master are formed;
    (d) transferring the pattern of the full area master into a master substrate; and
    (e) using the master substrate to form one or more replicas of the master substrate.

2. A method as defined in claim 1, wherein step (a) comprises e-beam lithography, x-ray lithography, or ion beam lithography, step (b) comprises metal lift-off and etching, and step (d) comprises dry etching, wet etching, or metal lift-off.

3. A method as defined in claim 1, wherein step (c) comprises repeatedly using the single section on a surface of the master substrate by rotating the sub-master in a circumferential direction around an axis of the master substrate to complete all of the plurality of sections of the full area master.

4. A method as defined in claim 3, wherein the sub-master is used to nanoimprint the master substrate.

5. A method as defined in claim 1, wherein each section contains servo sectors that are used for head positioning and data sectors that contain patterned media bits, and further comprising providing a dedicated servo section that is used for correction of track positioning errors between sections.

6. A method as defined in claim 5, wherein each section contains an equal number of servo sectors, the dedicated servo sections are located at a beginning of each section, and the dedicated servo sections correct track positioning errors that are smaller than one-half track width.

7. A method as defined in claim 5, wherein the dedicated servo section corrects for offsets between sections in a radial direction, an angular direction, and rotational tilt.

8. A method as defined in claim 1, wherein step (c) comprises defining even-numbered and odd-numbered sections, and nanoimprinting even-numbered sections first and then transferring a nanoimprinted polymer pattern into the master substrate by etching or metal lift-off, and nanoimprinting odd-numbered sections into polymer and transferring their pattern into the master substrate.

9. A method as defined in claim 1, wherein the full area master has an axis of rotation that defines an axial direction, a radial direction that is perpendicular to the axial direction, and tilt as being rotation with respect to the axis on a radial surface of the full area master, and further comprising measuring a value of tilt for each section with a single measurement per section if a radial shift is already measured, and creating a table with target PBS values for N zones inside each section.

10. A method as defined in claim 1, wherein step (c) is formed in a polymer, and step (d) comprises imprinting the pattern in the polymer into the master substrate.

11. A method of forming a patterned media disk and a related disk drive architecture for head positioning, the method comprising:
    (a) creating a portion of a sub-master pattern;
    (b) creating a sub-master based on the portion of the sub-master pattern, the sub-master comprising only a single section of a full area master that comprises a plurality of sections;
    (c) using the single section of the full area master as a pattern to form all of the plurality of sections of the full area master by rotating and applying the single section of the full area master about an axis of rotation of the full area master until all of the plurality of sections are formed;
    (d) transferring the pattern of the full area master into a master substrate; and
    (e) providing a dedicated servo section that is used for correction of track positioning errors between sections.

12. A method as defined in claim 11, wherein each section contains an equal number of servo sectors that are used for head positioning and data sectors that contain patterned media bits, the dedicated servo sections are located at a beginning of each section, and the dedicated servo section is provided for each section to define a plurality of dedicated servo sections that correct radial, angular, and rotational track positioning errors that are smaller than one-half track width.

13. A method as defined in claim 11, wherein step (c) comprises defining even-numbered and odd-numbered sections, and nanoimprinting even-numbered sections first and then transferring a nanoimprinted polymer pattern into the master substrate by etching or metal lift-off, and nanoimprinting odd-numbered sections into polymer and transferring their pattern into the master substrate; and further comprising:

forming a memory table stored in a read-only memory in a disk drive for errors present from an inner diameter to an outer diameter of a disk in the disk drive, the errors being measured relative to base values to keep a cylinder position in each section accurate by correcting with an error value stored in the memory table.

14. A method of forming a patterned media disk and a related disk drive architecture for head positioning, the method comprising:
  (a) creating a sub-master pattern;
  (b) forming a sub-master based on the sub-master pattern, the sub-master comprising only one section of a full area master that comprises multiple sections;
  (c) using said only one section as a pattern to form all of said multiple sections by repeatedly and sequentially rotating and applying said only one section about an axis of rotation of the full area master until all of said multiple sections are formed to define a full area master pattern;
  (d) transferring the full area master pattern of the full area master into a master substrate; and
  (e) providing a dedicated servo section that is used for correction of track positioning errors between said multiple sections.

15. A method as defined in claim 14, wherein each section contains an equal number of servo sectors that are used for head positioning, and data sectors that contain patterned media bits, the dedicated servo sections are located at a beginning of each section, and the dedicated servo section is provided for each section to define a plurality of dedicated servo sections that correct radial, angular, and rotational track positioning errors that are smaller than one-half track width.

16. A method as defined in claim 14, wherein step (c) comprises defining even-numbered and odd-numbered sections, and nanoimprinting even-numbered sections first and then transferring a nanoimprinted polymer pattern into the master substrate by etching or metal lift-off, and nanoimprinting odd-numbered sections into polymer and transferring their pattern into the master substrate; and further comprising:

forming a memory table stored in a read-only memory in a disk drive for errors present from an inner diameter to an outer diameter of a disk in the disk drive, the errors being measured relative to base values to keep a cylinder position in each section accurate by correcting with an error value stored in the memory table.

* * * * *

UNITED STATES PATENT AND TRADEMARK OFFICE
CERTIFICATE OF CORRECTION

| | | |
|---|---|---|
| PATENT NO. | : 7,312,939 B2 | Page 1 of 1 |
| APPLICATION NO. | : 11/066665 | |
| DATED | : December 25, 2007 | |
| INVENTOR(S) | : Zvonimir Z. Bandic et al. | |

It is certified that error appears in the above-identified patent and that said Letters Patent is hereby corrected as shown below:

Col. 6, Ln. 41: Delete [[PBS]] and replace with --PES--

Signed and Sealed this

Twentieth Day of May, 2008

JON W. DUDAS
*Director of the United States Patent and Trademark Office*